United States Patent [19]

Nakata

[11] Patent Number: 5,937,506
[45] Date of Patent: Aug. 17, 1999

[54] METHOD OF MAKING A MOTOR TERMINAL DEVICE

[75] Inventor: Masashi Nakata, Toyohashi, Japan

[73] Assignee: Asmo Co., Ltd., Kosai, Japan

[21] Appl. No.: 08/786,983

[22] Filed: Jan. 24, 1997

Related U.S. Application Data

[62] Division of application No. 08/399,142, Mar. 6, 1995, Pat. No. 5,656,878.

[30] Foreign Application Priority Data

Mar. 7, 1994 [JP] Japan .................................. 6-62069

[51] Int. Cl.$^6$ .................................................. H02K 15/14
[52] U.S. Cl. ............................ 29/596; 29/602.1; 174/52.1
[58] Field of Search ...................... 29/596, 598, 854–856, 29/602.1; 310/71, 68; 206/722; 361/752, 760; 174/52.1

[56] References Cited

U.S. PATENT DOCUMENTS

| 4,355,458 | 10/1982 | Woods et al. . |
| 4,408,171 | 10/1983 | Akino et al. . |
| 4,472,693 | 9/1984 | Uemura et al. . |
| 5,025,184 | 6/1991 | Sekine et al. . |
| 5,140,207 | 8/1992 | Baumeister et al. . |
| 5,408,154 | 4/1995 | Meiser et al. . |
| 5,430,931 | 7/1995 | Fisher et al. . |
| 5,714,716 | 2/1998 | Yamada .................................. 174/52.1 |

FOREIGN PATENT DOCUMENTS

| 59-60851 | 4/1984 | Japan . |
| 6-199206 | 7/1994 | Japan . |

*Primary Examiner*—Carl E. Hall
*Attorney, Agent, or Firm*—Burns, Doane, Swecker & Mathis, LLP

[57] ABSTRACT

A motor terminal device comprises a storage case having an engaging section and installed on the motor side and a storage cover having an engaged section which can be engaged with the engaging section. The storage case stores external connecting terminals and electrical components, while the storage cover has a projecting pressers located in a position corresponding to the electrical components to secure the electrical components by pressing. The external connecting terminals have a latch hole and the storage case has a latch projection. Detachment of external connecting terminals is prevented as the latch projection is engaged with the latch hole.

8 Claims, 11 Drawing Sheets

METHOD OF MAKING A MOTOR TERMINAL DEVICE

This application is a divisional of application Ser. No. 08/399,142, filed Mar. 6, 1995, now U.S. Pat. No. 5,656,878.

CROSS REFERENCE TO RELATED APPLICATION

This application is based on and claims priority of Japanese Patent Application No. 6-62069 filed on Mar. 7, 1994, the content of which is incorporated herein by reference.

BACKGROUND OF THE INVENTION

1. Field of the invention

This invention relates to a motor terminal device, in particular, a motor terminal device which has electrical components in addition to connecting terminals.

2. Related art

Conventionally, various types of electric motors have been used to convert direct-current electric power to mechanical drive power. However, such motors sometimes adversely influence a computer or radio placed near the motors in the vehicle, because they generate electrical noise. Thus, to eliminate electrical noise, some motors employed electrical components like LC elements. It is necessary to eliminate electrical noise before it influences others, so some motors have the electrical components installed thereon. The electrical components are connected to terminals via electrical lead wires, and stored in a casing attached to the motor as a terminal device.

In some cases, such a motor may be used for a vehicle as disclosed in Japanese Utility Model Laid-Open No. 59(1984)-60851. In these cases, since the motor is frequently subjected to quake or vibration during vehicle running, it is necessary to maintain the electrical components and terminals in stable condition. Furthermore, conventionally, the lead wires used to connect the electrical components are shaken due to vibration, causing a possibility of connection failure between the electrical components and terminals. Connecting the electrical components and terminals using lead wires is time-consuming work.

Moreover, for a motor like an automotive wiper motor installed in a place where it is exposed to rain water, a grommet is provided in the outlet of the lead wire from the motor and packing is used at the outlet of the terminal for the purpose of water proofing. To use the above-mentioned electrical components in this kind of motor, it is also necessary for the electrical components to be water proof. Thus, in conventional motors, the electrical components and terminals are stored in the terminal device, which is then filled with resin like urethane or silicon. By this, not only are the electrical components water proofed but also the lead wires are secured by the resin, thus eliminating detachment of the lead wires from the terminals.

However, resin like urethane or silicon which is used to fill the terminal device is not only expensive, but also it is difficult to fill the terminal device with resin evenly, making filling work troublesome.

SUMMARY OF THE INVENTION

In view of the above conventional problem, this invention has a purpose to provide a motor terminal device in which electrical components and terminals can be secured to a motor side stably to improve shock proofing and, more particularly, to a motor terminal device in which the electrical components can be connected to the terminals securely and connecting work is made simple.

According to one aspect of this invention, a motor terminal device comprises a storage case having an engaging section and installed on a motor side and a storage cover having an engaged section which can be engaged with the engaging section. The storage case contains electrical components and external connecting terminals which provide electrical connection between the motor side and external side. The storage cover has an electrical component holder, located in a position corresponding to the electrical components, to hold and secure the electrical components. The electrical component holder presses down the electrical components to secure them when the storage cover is placed on the storage case and the engaging section is engaged with the engaged section. When the storage cover is placed on the storage case and the engaging section is engaged with the engaged section, the electrical component holder presses down the electrical components to secure them. By this, the electrical components can be secured and shock proofing can also be improved.

According to another aspect of this invention, a motor terminal device comprises a storage case having an engaging section and installed on a motor side and a storage cover having an engaged section which can be engaged with the engaging section. The storage case contains electrical components and an external connecting terminals which provide electrical connection between the motor side and external side. The external connecting terminal has an anti-release male stopper and the storage case has a guide which guides the external connecting terminal to a mount position and anti-release female stopper which is engaged with the anti-release male stopper at the mount position. The storage cover has a projection which is inserted in a position where it is sandwiched between the external connecting terminal and anti-release female stopper. Engagement of the anti-release male stopper and anti-release female stopper is maintained by the projection. When the external connecting terminal is installed in the mount position, the anti-release male stopper is engaged with the anti-release female stopper to prevent detachment of the external connecting terminal. Furthermore, the external connecting terminal can be installed in a single operation because it is guided by the guide. Moreover, it can be recognized whether or not the external connecting terminal is installed in the appropriate position by checking whether the anti-release male stopper is engaged with the anti-release female stopper properly. By this, installation work of the external connecting terminal can be performed simply and properly.

After the external connecting terminal is installed appropriately, placing the storage cover on the storage case will cause the projection provided on the storage cover to be inserted into a position where it is sandwiched between the external connecting terminal and anti-release female stopper. As a result, the anti-release female stopper is sandwiched and secured between the external connecting terminal and anti-release female stopper so that it will not bend. The projection secures engagement of the anti-release male stopper with the anti-release female stopper, thus preventing detachment of the external connecting terminal. Shock proofing is also improved.

In the event that the external connecting terminal is not installed in the appropriate position, the anti-release male stopper will not engage the anti-release female stopper when the storage cover is placed on the storage case, thus the pair of anti-release female stoppers bend. In this case, if measures are taken so that the projection cannot be inserted due to obstruction by the anti-release female stopper, the storage cover will not be placed on the storage case properly. This indicates that the external connecting terminal is not installed in the appropriate position. By this, proper installation of the external connecting terminal can be assured.

It is preferable for the pair of anti-release female stoppers to be provided on the side opposed to the pair of external connecting terminal, and to be engaged with the anti-release male stopper to cause the projection to be inserted between the pair of anti-release female stoppers. This causes the projection to stop the anti-release female stopper from bending in the opposite direction, maintaining engagement between the anti-release male stopper and anti-release female stopper. Provided that a noise filter is used as the above-mentioned electrical components, which eliminates electrical noise generated during rotation of the motor, electrical noise generated from the motor will be eliminated or filtered, preventing adverse affects on a radio or computer located near the motor in the vehicle.

Furthermore, an internal connecting terminal can be installed to provide electrical connection between a motor internal side and the external connecting terminal, so that either the external connecting terminal or internal connecting terminal is put into one unit with a plate-shaped connecting plate connected directly to the electrical components.

The connecting plate and the external connecting terminal or internal connecting terminal are put in one unit, and the electrical components is connected directly to this connecting plate. The connecting plate takes the shape of the plate, thus it remains stable even if it is subjected to vibration, unlike lead wires. This maintains stable connection with the electrical components, reducing a possibility of connection failure like detachment of connection. Moreover, unlike a lead wire, the connecting plate does not bend easily because of its shape, thus it can be connected to the electrical components easily, making connecting work simple.

Furthermore, since the connecting plate is put in one unit with the external connecting terminal or internal connecting terminal, fixing the external connecting terminal or internal connecting terminal will automatically fix the connecting plate, thus eliminating the need for fixing work of the connecting plate. Conversely, fixing the connecting plate will automatically fix the external connecting terminal or internal connecting terminal, thus eliminating the need for fixing work of the external connecting terminal or internal connecting terminal.

DETAILED DESCRIPTION OF THE PREFERRED EMBODIMENTS

This invention is explained in detail below with reference to presently preferred embodiments shown in the accompanying drawings.

Figure 1A:
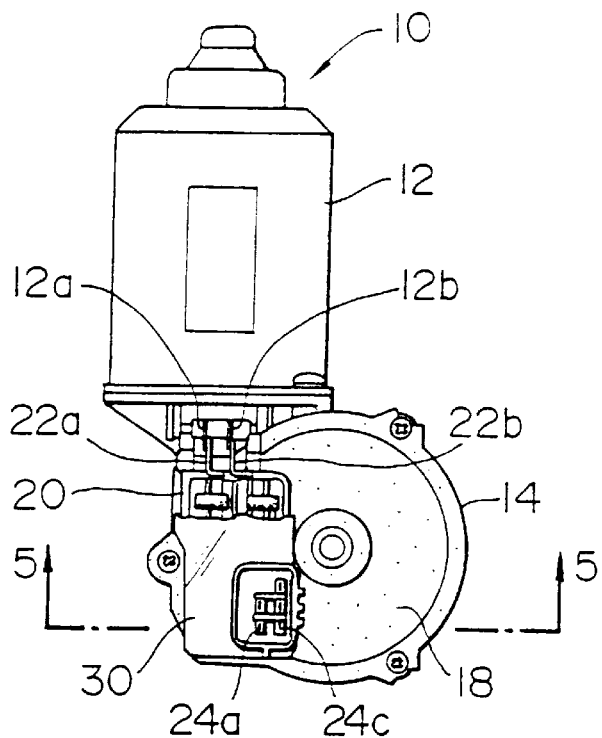
FIGS. 1A through 1C show the first embodiment of this invention in an automotive wiper motor and are a top view, a bottom view and a front view of a motor terminal device, respectively, all in partially in cross section.
Figure 1B:
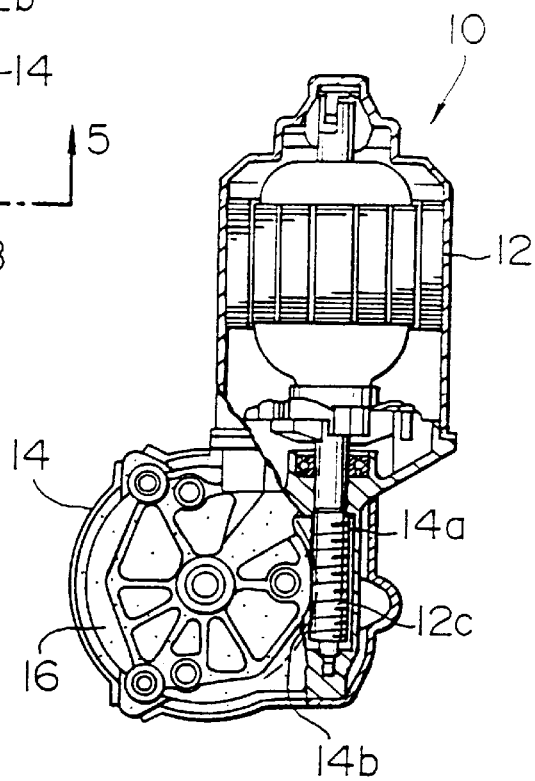
Figure 1C:
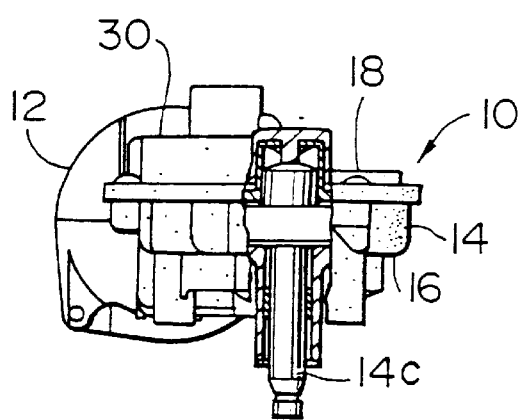

Referring first to FIGS. 1A through 1C showing the first embodiment of this invention applied to an automotive wiper motor, wiper motor 10 includes motor section 12 and speed reduction gear section 14. Motor section 12 has terminal 12a which is connected to a low-speed circuit (not shown in the figures) used to operate the wiper (not shown in the figures) at a low speed, and terminal 12b which is connected to a high-speed circuit (not shown in the figures) used to operate the wiper at a high speed.

Speed reduction gear section 14 has gear case 16 accommodating worm 14a and worm wheel 14b, and gear cover 18 covering an opening of gear case 16. Worm 14a rotates together with rotary shaft 12c of motor section 12, and rotational output of worm 14a is conveyed to worm wheel 14b, whose rotational output is then conveyed to output shaft 14c.

Gear cover 18 has, on its outer surface, an LC noise filter to eliminate electrical noise generated from motor section 12 and storage case 20 to store the noise filter and a terminal used for external connections. Storage case 20 is covered by storage cover 30.

Figure 2A:
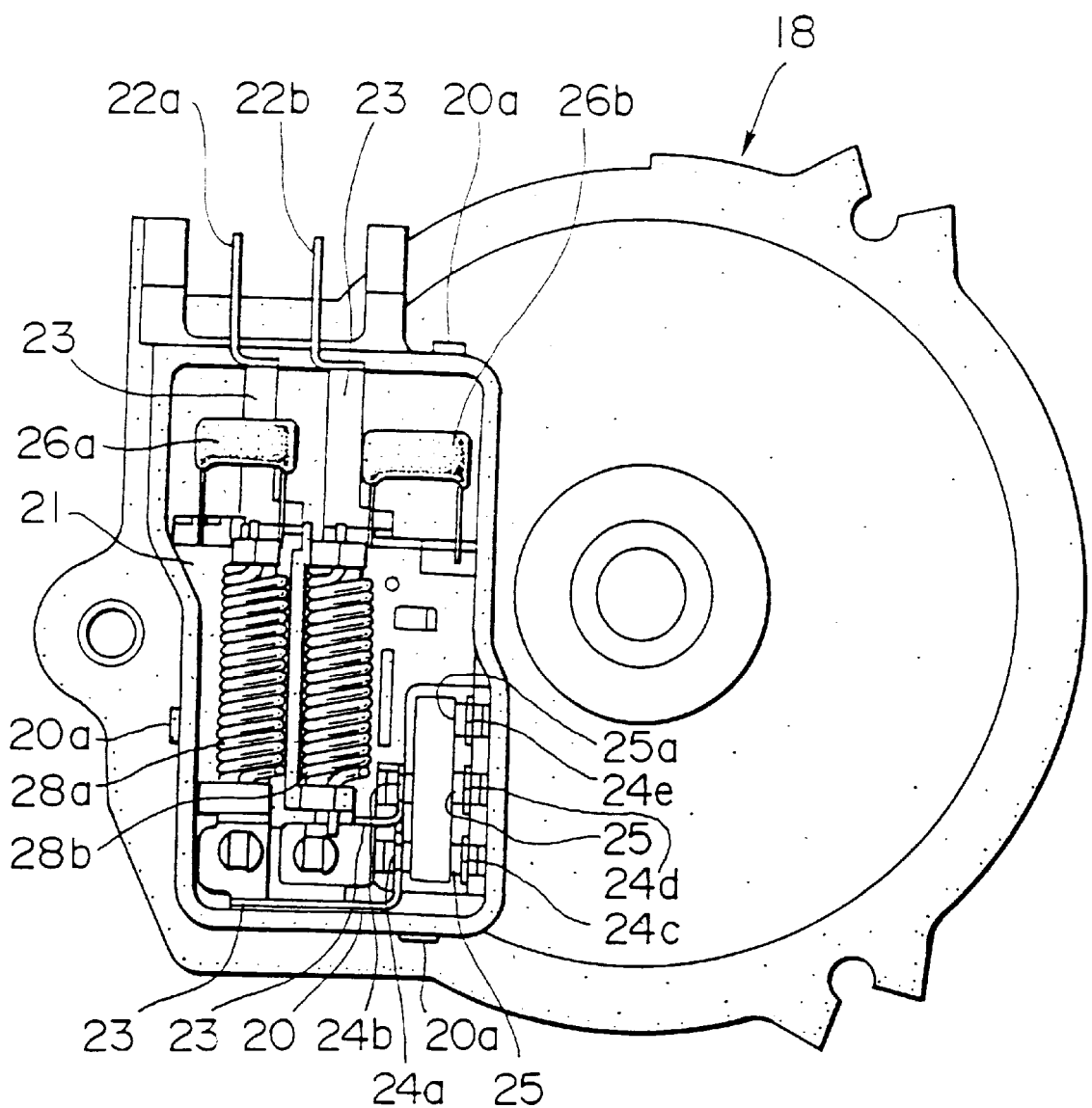
FIG. 2A is an enlarged top view of the gear cover used in the first embodiment.

FIG. 2A is an enlarged top view of gear cover 18. In this figure, storage case 20 provided on gear cover 18 has engaging projection 20a to be engaged with storage cover 30. Inside storage case 20, there are internal connecting terminals 22a and 22b, external connecting terminals 24a through 24e, and LC noise filter comprised of capacitors 26a, 26b and choke coils 28a and 28b.

Figure 3A:
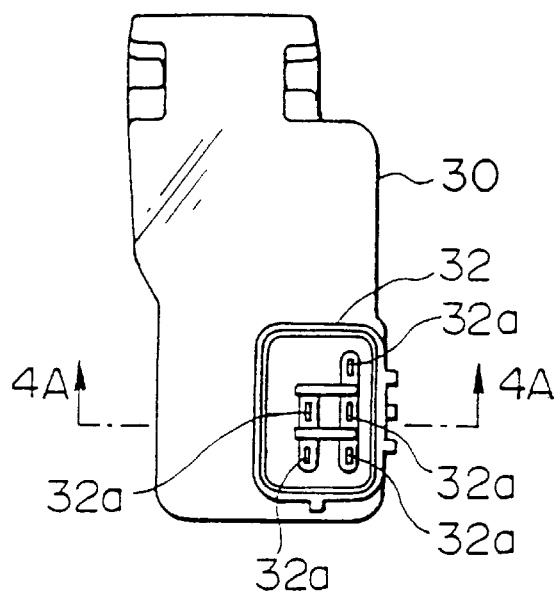
FIGS. 3A through 3D show the storage cover used in the first embodiment and a top view, bottom view, rear view and right-side view of the storage cover, respectively.
Figure 3C:
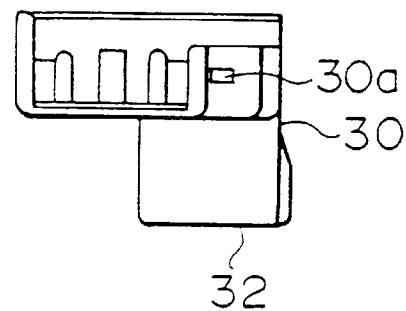
Figure 3B:
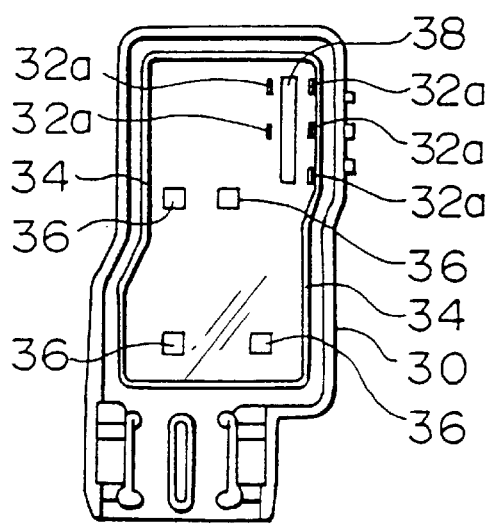
Figure 3D:
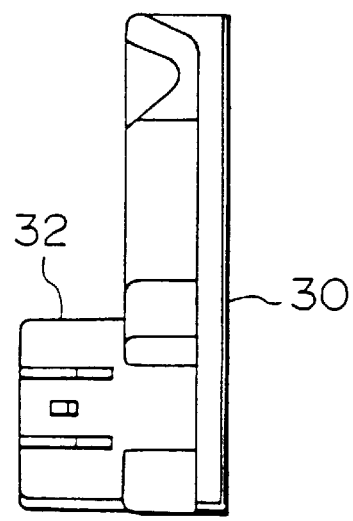
Figure 4A:
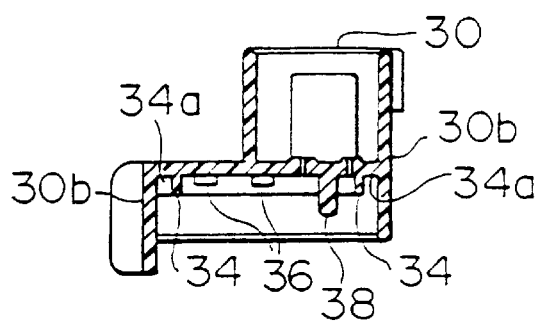
FIGS. 4A through 4B are cross sectional views of the storage cover in FIG. 3D.

Capacitors 26a, 26b and choke coils 28a, 28b are sandwiched between bottom 21 of storage case 20 and projecting pressers 36 of storage cover 30 (FIGS. 3B and 4A). Thus, capacitors 26a, 26b or choke coils 28a, 28b can still be secured stably even under severe shaking or vibrating environment in a vehicle.

Figure 2B:
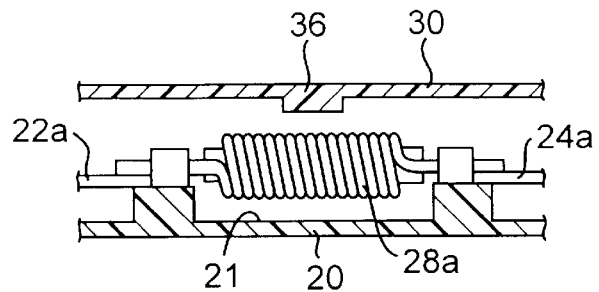
FIGS. 2B through 2E show enlarged sectional views of portions of the gear cover shown in FIG. 2A.
Figure 2C:
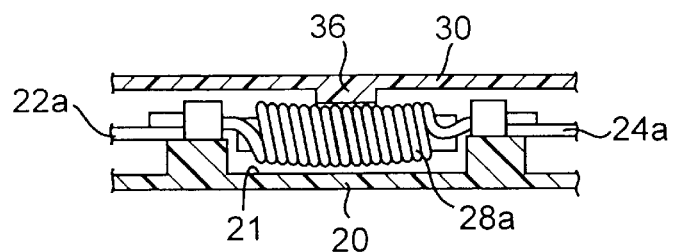
Figure 2D:
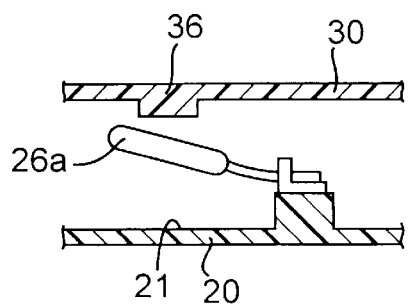
Figure 2E:
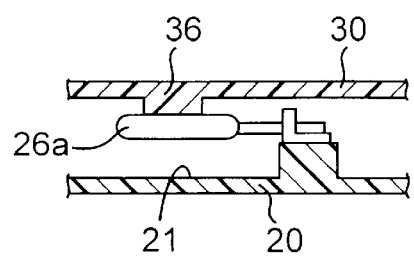

Capacitors 26a, 26b and choke coils 28a, 28b can also be supported stably if they are positioned out of contact with bottom 21 of storage case 20, as shown in FIGS. 2B and 2D and are pressed downward by projecting pressers 36, as shown in FIGS. 2C and 2E. In particular, choke coils 28a and 28b can be supported more stably if they are supported at their ends so that they are positioned not out of contact with bottom 21 of storage case 20 and then pressed downward by projecting pressers 36, since they will bend downwards and produce tension.

In the event that an elastic material like butyl rubber or urethane foam is placed between projecting pressers 36 and capacitors 26a, 26b and choke coils 28a, 28b and then these components are pressed downward, small difference in dimensions between these electrical components and projecting pressers 36 will be eliminated, thus providing more stable support for these components.

Capacitors 26a, 26b and choke coils 28a, 28b form a noise filter which eliminates electrical noise generated from motor section 12 (FIGS. 1A through 1C). Each of internal connecting terminals 22a, 22b and external connecting terminals 24a through 24e is formed by bending a conductive plate so that connecting plates 23 used to directly connect the above capacitors or choke coils is constructed into one unit.

Figure 7:
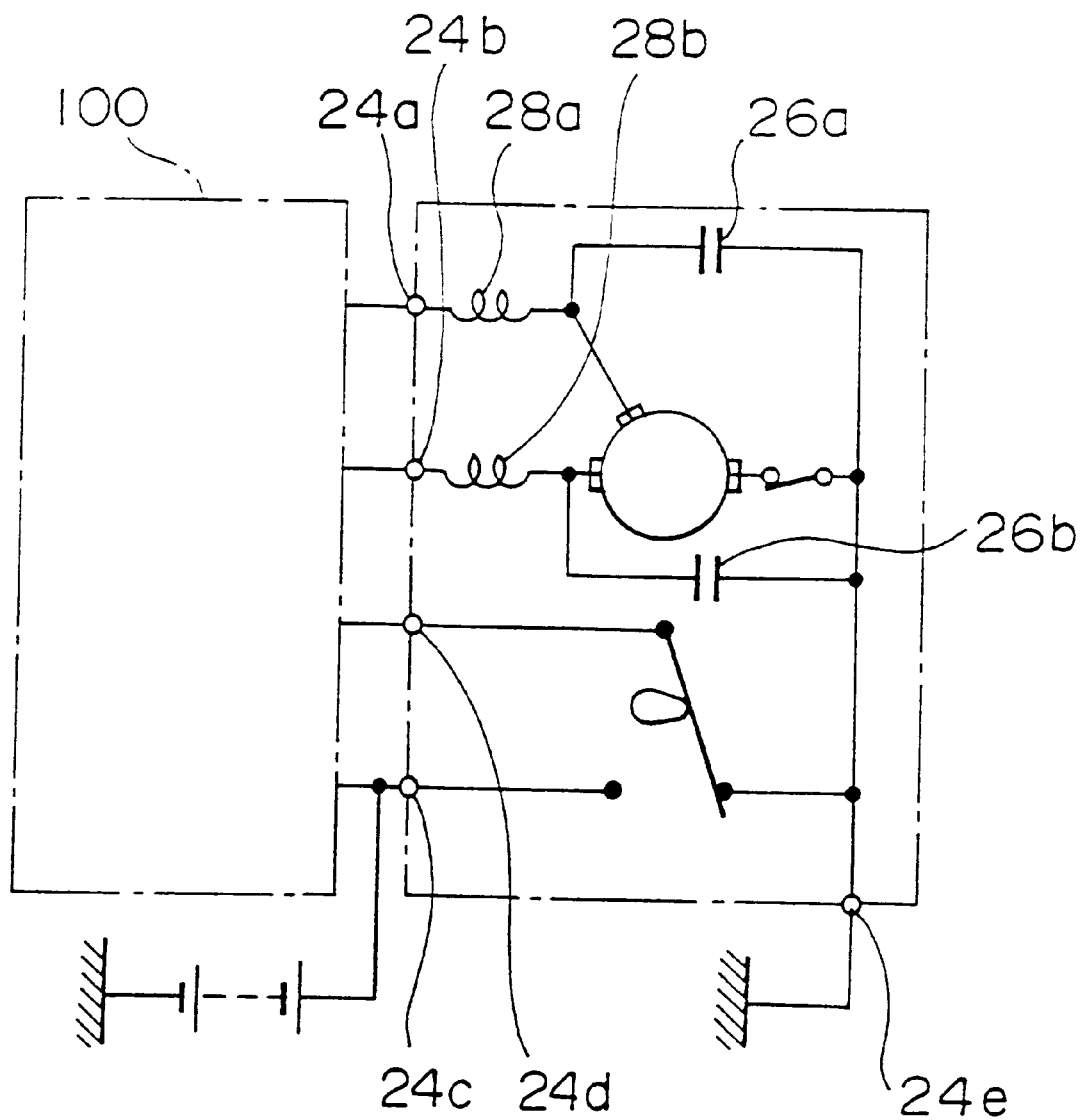
FIG. 7 shows a circuit diagram of external connecting terminals and electrical components in the first embodiment.

FIG. 7 shows a connecting circuit diagram for the above components. As shown in FIGS. 2A and 7, external connecting terminal 24a is connected to one end of choke coil 28a via connecting plate 23, and the other end of choke coil 28a is connected to connecting plate 23 of internal connecting terminal 22a. One end of capacitor 26a is also connected to connecting plate 23 of internal connecting terminal 22a, and the other end of capacitor 26a is grounded. External connecting terminal 24b is connected to one end of choke coil 28b via connecting plate 23, and the other end of choke coil 28b is connected to connecting plate 23 of internal connecting terminal 22b. One end of capacitor 26b is also connected to connecting plate 23 of internal connecting terminal 22b, and the other end of capacitor 26b is grounded.

Capacitors 26a, 26b or choke coils 28a, 28b are connected directly to connecting plate 23, without use of electrical lead wires. These connections are made by inserting terminals of the capacitors 26a, 26b and choke coils 28a, 28b into slots (not shown in the figures) provided on connecting plates 23 and then applying heat to effect connection. This makes connecting work easy and connecting materials simple, because no soldering is performed.

Furthermore, if connecting plates 23 are fixed, capacitors 26a, 26b or choke coils 28a, 28b will not be detached even if they are subjected to vibration. Connecting plates 23 can also be fixed more simply than lead wires, so fixing work can also be simplified.

Fixing of connecting plates 23 is carried out, for instance, by providing a projection on bottom 21 of storage case 20, which is formed beforehand using plastic, and providing a hole on connecting plate 23, then inserting the projection into the hole and heating it to melting point until it is fixed to the hole, or by providing a pawl on connecting plate 23 and inserting it into a hole provided on storage case 20 then bending the projected part of the pawl to fix.

Connecting plates 23 and internal connecting terminals 22a, 22b or external connecting terminal 24a, 24b are provided in one unit, thus connecting plates 23 can be fixed if internal connecting terminals 22a, 22b or external connecting terminals 24a, 24b are fixed, thus making fixing work simple.

As shown in FIG. 7, external connecting terminals 24a, 24b, 24c and 24d are connected to electronic control circuit 100 which detects the position of the wiper and controls the motor, and external connecting terminal 24e is grounded. Circuit 100 is provided on the back of gear cover 18.

As shown in FIGS. 1A through 1C, internal connecting terminal 22a is connected to terminal 12a of motor section 12 and internal connecting terminal 22b is connected to terminal 12b of motor section 12. Both internal connecting terminals 22a and 22b are connected to the brush side inside motor section 12. External connecting terminals 24a through 24e are all latched and fixed by latch 25. This is described below using FIG. 5 which is a cross sectional view along the line 5—5 in FIG. 1A.

Figure 5:
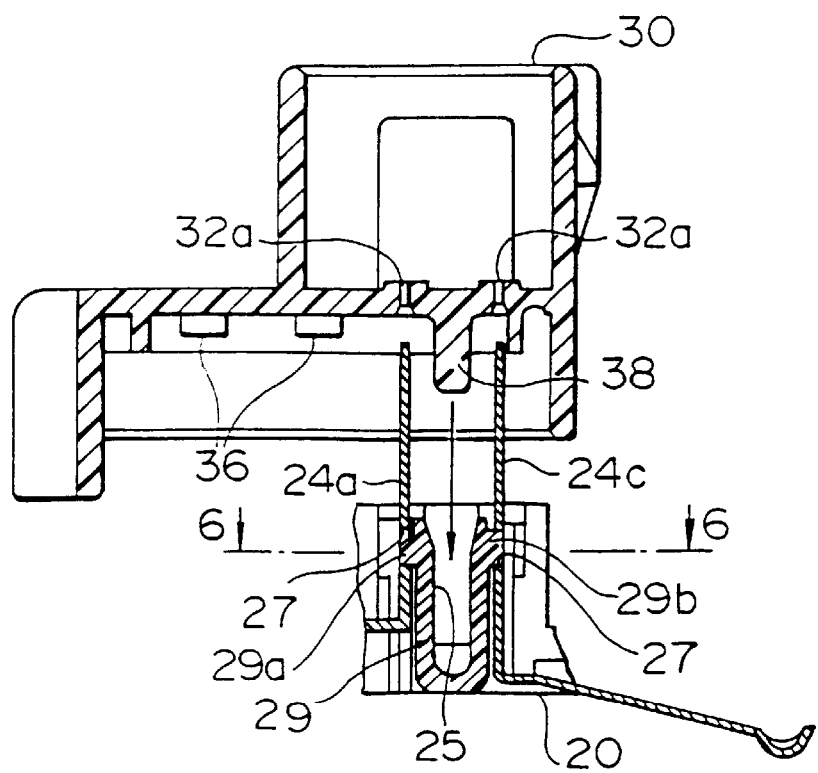
FIG. 5 is a cross sectional view taken along the line 5—5 in FIG. 1A and shows the motor when the storage cover is placed on the storage case.

In FIG. 5, latch 25 is formed into a monoblock U-shape on the internal bottom surface of storage case 20, and latch projection 29 (29a and 29b), which is projecting in opposite direction, is provided at the upper section of latch 25. Latch 25a corresponding to external connecting terminal 24e (FIG. 2A) is not U-shaped, but formed independently.

On terminal connecting terminals 24a and 24c, latch hole 27 to be engaged with latch projection 29 is provided. These latch projection 29 and latch hole 27 are relatively positioned so that they are engaged when external connecting terminals 24a and 24c is installed in the specified mount positions. Moreover, external connecting terminals 24a and 24c can be installed facing each other outside of latch 25.

Figure 6:
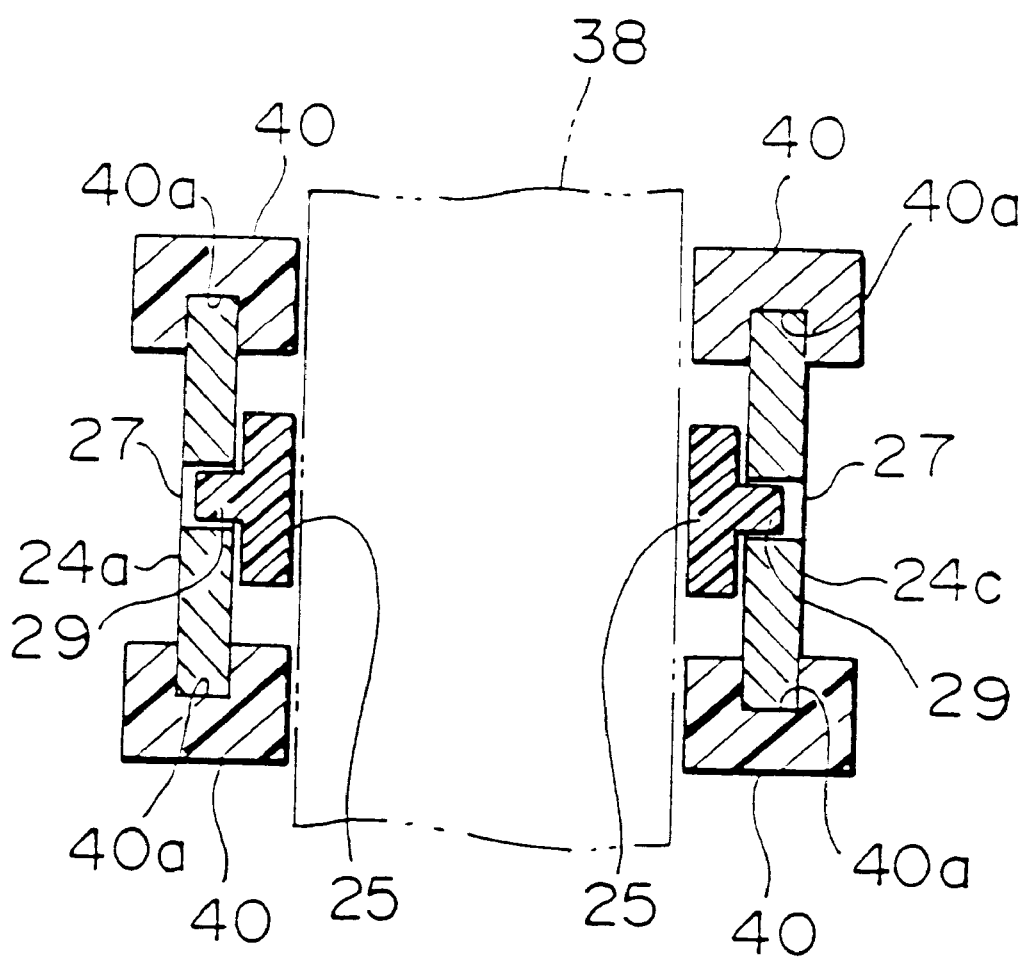
FIG. 6 is a cross-sectional view taken along the line 6—6 in FIG. 5.

FIG. 6 shows external latch holes 27 provided on connecting terminals 24a and 24c and latch projections 29 of latch 25 when they are engaged with each other. FIG. 6 is a cross sectional view along the line 6—6 in FIG. 5. In this figure, terminal supporters 40 are provided on the bottom of storage case 20, and guiding slots 40a are provided on the opposite face of each terminal supporter 40. Guiding slots 40a guide the ends of external connecting terminals 24a and 24c to the specified position while holding the same.

When external connecting terminals 24a and 24c are slid to the specified mount positions while guided by guiding slots 40a, latch holes 27 of external connecting terminals 24a and 24c are engaged with latch projections 29 of latch 25.

As shown in FIG. 6, external connecting terminal 24a is inserted into guiding slots 40a from top of storage case 20 and then slid, while external connecting terminal 24c is inserted from the back side of storage case 20 and then slid on guiding slots 40a. Since the direction in which external connecting terminals 24a and 24c are inserted differs, latch projection 29a on external connecting terminal 24a differs in shape from latch projection 29b on external connecting terminal 24c. Latch projection 29a is tapered at its top so that external connecting terminal 24a can be inserted easily when it is inserted from top, while it has a right-angled projection at its bottom to prevent detachment. Latch projection 29b is tapered at its bottom so that external connecting terminal 24c can be inserted easily when it is inserted from bottom, while it has a right-angled projection at its bottom to prevent detachment.

When external connecting terminals 24a and 24c are inserted along guiding slots 40a and installed in the specified positions, latch projections 29 are engaged with latch holes 27. That is, if latch projections 29 are not engaged with latch hole 27, it is indicated that external connecting terminals 24a and 24c are not installed in the specified positions. Thus, it can be understood whether or not external connecting terminals 24a and 24c are installed in the specified positions by checking whether the latch projections 29 are engaged with the latch holes 27.

Furthermore, as shown in FIG. 6, when projection 38 formed on storage cover 30 is inserted between a pair of latches 25 with latch projections 29 engaged with latch holes 27 properly, latches 25 will not bend inwards, thus maintaining engagement between latch projections 29 and latch holes 27.

If latch projections 29 are not engaged with latch holes 27, the pair of latches 25 will be pushed and opened inwards, causing them to bend in opposite directions. As a result, no space for the insertion of projection 38 can be provided. In this case, even if an attempt is made to place storage cover 30 on storage case 20, projection 38 comes into contact with the top end of latch 25, disenabling installation of storage cover 30 on storage case 20. From this, it can be recognized that latch projections 29 are not engaged with latch holes 27, that is, external connecting terminals 24a and 24c are not installed in the appropriate positions.

Details of storage cover 30 is shown in FIGS. 3A through 3D which are a top, bottom, rear and right side views of storage cover 30, respectively.

Storage cover 30 is so shaped that it covers storage case 20, and has engaging hole 30a which corresponds to engaging projection 20a (FIG. 3C). Storage cover 30 also has connector section 32 on its top. Holes 32a are provided on this connector section 32 so that external connecting terminals 24a through 24e can be inserted.

Thus, when storage cover 30 is placed on storage case 20, engaging projection 20a is engaged with engaging hole 30a to prevent detachment of storage cover 30. Connector section 32 will accommodate external connecting terminals 24a through 24e and act as a connector.

Figure 4B:
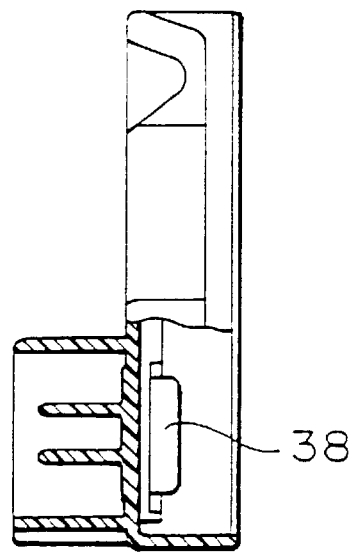

On the inner surface of storage cover 30, inner rib 34, projecting pressers 36 and projection 38 are provided (FIG. 3B). As shown in FIG. 4A showing a cross sectional view along the line 4A—4A in FIG. 3A and FIG. 4B showing a partial cross sectional view of FIG. 3D.

In these figures, inner rib 34 is formed on the inner surface of storage cover 30 so that it can be positioned inside storage case 20. Moreover, inner rib 34 is provided so that it covers the entire circumference of storage case 20. Employment of inner rib 34 allows sealing slot 34a to be provided between inner rib 34 and external wall 30b of storage cover 30. If sealing slot 34a is filled with sealing material like butyl rubber or liquid gasket, water-tightness and pair-tightness between storage case 20 and storage cover 30 will be improved, resulting in improved water proofing.

Projecting pressers 36 are provided at positions corresponding to capacitors 26a, 26b and choke coils 28a, 28b. Capacitors 26a, 26b and choke coils 28a, 28b are pressed down and secured by projecting pressers 36. As described above, since detachment of storage cover 30 from storage case 20 is prevented by engaging projection 20a and engaging hole 30a, storage cover 30 will not be removed even if capacitors 26a, 26b and choke coils 28a, 28b are pressed down by projecting pressers 36.

Projection 38 is inserted into the U-shaped part of latch 25 provided on storage case 20 to prevent detachment of external connecting terminals 24a through 24e. Thus, projection 38 has such a shape that it can be press-fit into the U-shaped part of latch 25.

In FIG. 5 which is a cross sectional view taken along the line 5—5 in FIG. 1A, and shows storage cover 30 placed on storage case 20, external connecting terminals 24a and 24c are installed on the specified positions of storage case 20. Since external connecting terminals 24a and 24c are already installed on the specified positions, latch holes 27 and latch projections 29 are engaged with each other. When storage cover 30 is placed on storage case 20 with latch holes 27 engaged with latch projections 29, projection 38 is inserted into the U-shaped part of latch 25, thus latch 25 is fixed and does not bend inward. As a result, latch projections 29 will not detach from latch holes 27, preventing detachment of external connecting terminals 24a and 24c.

If external connecting terminals 24a and 24c have not been installed in the appropriate positions, latch projections 29 will not be engaged with latch holes 27, thus latch 25 bends inward. In this case, storage cover 30 cannot be placed on storage case 20 properly because projection 38 does not enter the U-shaped part of latch 25, even if an attempt is made to place storage cover 30 on storage case 20. Thus, projection 38 also acts as a type of indicator to indicate whether external connecting terminals 24a and 24c are positioned properly.

In the similar manner as external connecting terminals 24a and 24c, external connecting terminals 24b and 24d are installed and arranged. External connecting terminal 24e is not U-shaped and formed independently, but it is still identical to other external connecting terminals in that it is fixed by projection 38 so that it does not bend.

Functional effects of this embodiment are summarized as follows. In this embodiment, capacitors 26a, 26b and choke coils 28a, 28b are fixed stably when storage cover 30 is placed on storage case 20, because they are pressed down by projecting pressers 36 formed on storage cover 30. Moreover, latch projections 29 are formed on latch 25 provided on storage case 20, and latch holes 27 are formed on external connecting terminals 24a through 24e. Engagement between latch projections 29 and latch holes 27 will prevent detachment of external connecting terminals 24a through 24e. Furthermore, when projection 38 is inserted between the pair of latches 25, latches 25 do not bend, maintaining engagement between latch projections 29 and latch holes 27.

In addition to the above embodiment, this invention can be used in various forms. For instance, storage case 20 can be provided on motor section 12, though it is provided on gear cover 18 in the above embodiment. It is also possible to store other necessary electrical components in storage case 20, though only capacitors and choke coils are stored in storage case 20 in the above embodiment. Moreover, the above embodiment uses a structure in which latch projections 29 are provided on the side opposite to external connecting terminals 24a through 24d and projection 38 is inserted between the pair of latch projections 29, however another structure can be employed. For instance, an anti-release female stopper can be provided outside an external connecting terminal and a projection can be provided outside this anti-release female stopper. In this case, the anti-release female stopper may be sandwiched between the external connecting terminal and projection to maintain engagement with the anti-release male stopper.

Effect of the invention

As described above, electrical components are pressed down and secured by an electrical components pressing section when the storage cover is placed on the storage case, thus stability and resistance of the electrical components to vibration can be improved. Detachment of external connecting terminals can also be prevented because the anti-release male stopper (e.g., latch projection) is engaged with the anti-release female stopper. In addition, engagement between the anti-release male stopper and anti-release female stopper is maintained by the projection to provide proper prevention of detachment of external connecting terminals. This also results in improved vibration resistance. It is also possible to prevent detachment of external connecting terminals by providing a pair of anti-release female stoppers on the side opposite to external connecting terminals and inserting a projection between this pair of anti-release female stoppers.

Next, the second embodiment of this invention will be described.

Figure 8A:
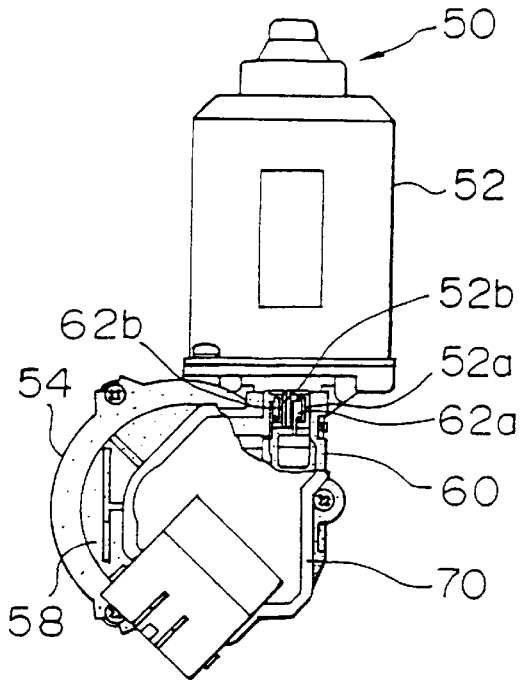
FIGS. 8A through 8C show the second embodiment of this invention in an automotive wiper motor and are a top view, a bottom view and a front view of a motor terminal device, respectively, all in partially in cross section.
Figure 8B:
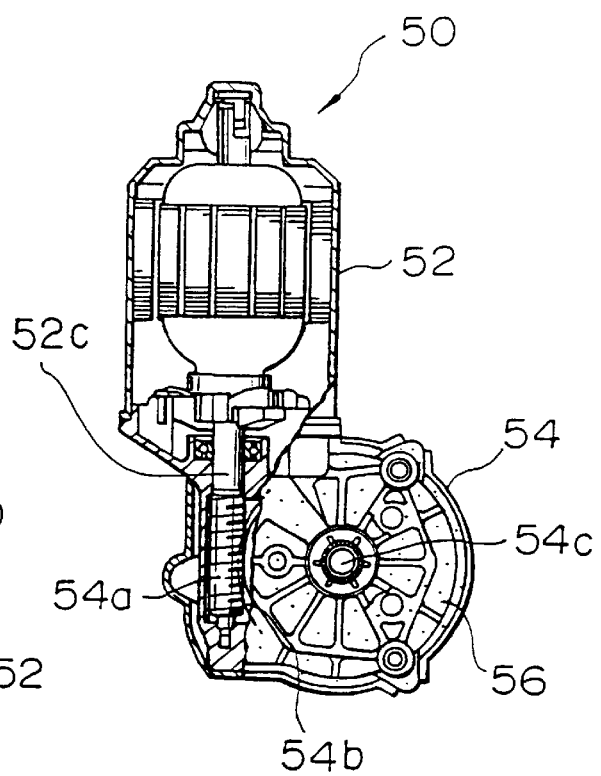
Figure 8C:
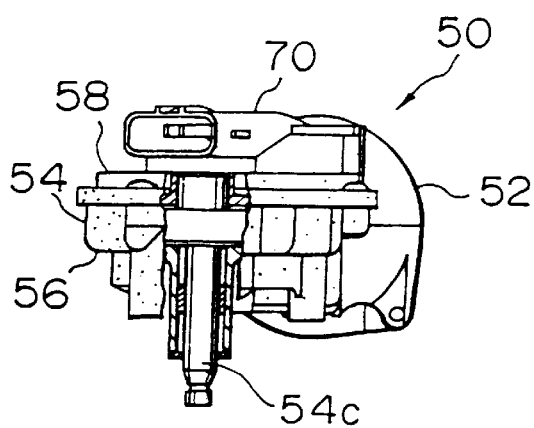

In FIGS. 8A through 8C showing the second embodiment applied to an automotive wiper motor, wiper motor 50 has motor section 52 and speed reduction gear section 54. Motor section 52 has terminal 52a which is connected to a low-speed circuit (not shown in the figures) used to operate the wiper (not shown in the figures) at a low speed, and terminal 52b which is connected to a high-speed circuit (not shown in the figures) used to operate the wiper at a high speed.

Speed reduction gear section 54 has gear case 56 accommodating worm 54a and worm wheel 54b, and gear cover 58 covering an opening of gear case 56. Worm 54a rotates together with rotary shaft 52c of motor section 52, and rotational output of worm 54a is conveyed to worm wheel 54b, whose rotational output is then conveyed to output shaft 54c.

Gear cover 58 has a noise filter on its outer surface to eliminate electrical noise generated from motor section 52, and storage case 60 to store the noise filter and terminals used for external connections. Storage case 60 is covered by storage cover 70.

Figure 9:
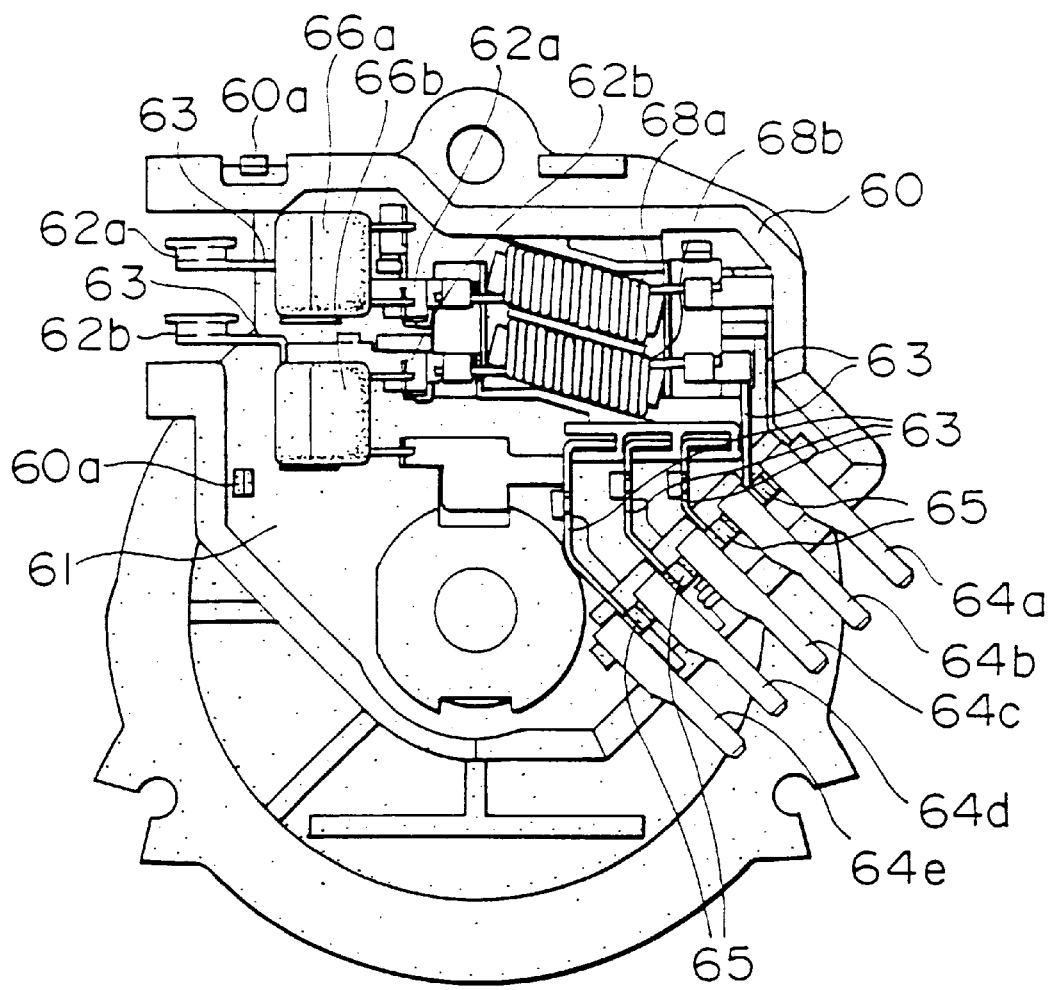
FIG. 9 is an enlarged top view of the storage case used in the second embodiment.

FIG. 9 is an enlarged top view of gear cover 58. In this figure, storage case 60 provided on gear cover 58 has engaging projection 60a to be engaged with storage cover 70. Inside storage case 60, there are internal connecting terminals 62a and 62b, external connecting terminals 64a through 64e, capacitors 66a and 66b, and choke coils 68a and 68b.

Figure 10A:
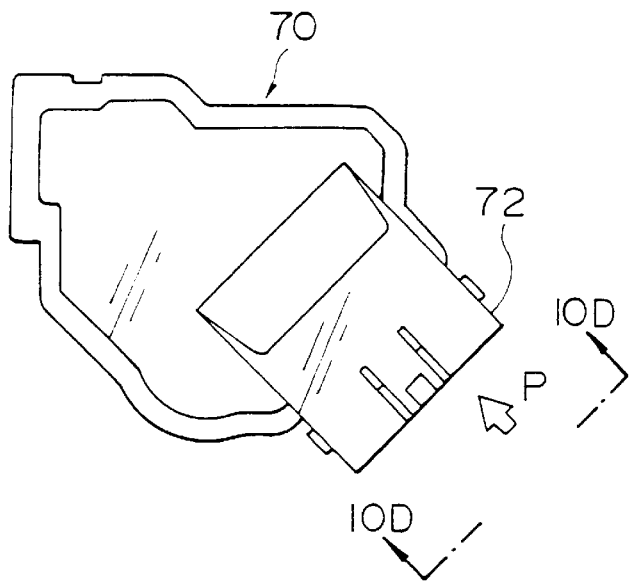
FIGS. 10A through 10D show the storage cover used in the second embodiment and a top view, bottom view, rear view and right-side view of the storage cover, respectively.
Figure 10C:
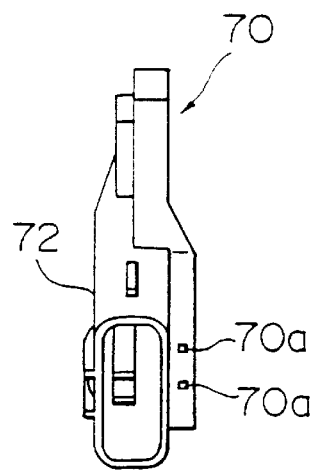
Figure 10B:
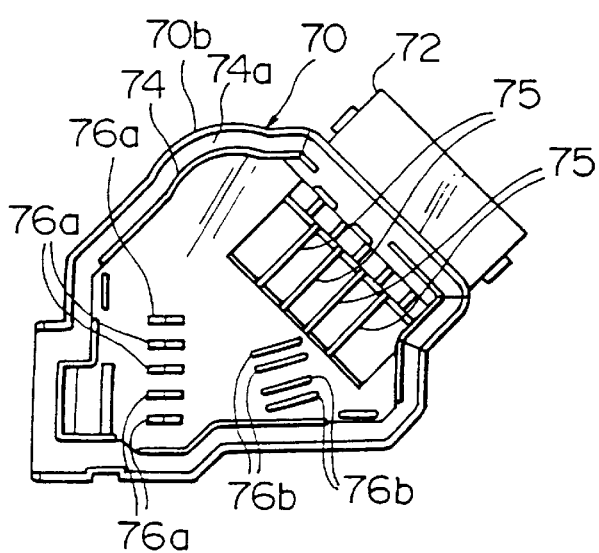
Figure 10D:
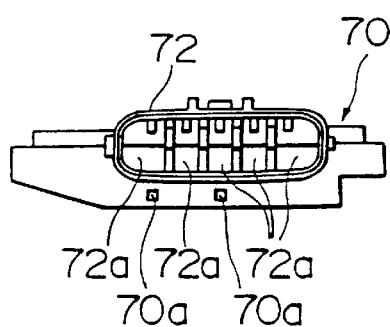

As shown in FIG. 10B, storage cover 70 has the first projecting pressers 76a which hold capacitors 66a and 66b by pressing the same, and the second projecting pressers 76b which hold choke coils 68a and 68b by pressing the same. Capacitors 66a and 66b are sandwiched between the first projecting pressers 76a and bottom 61 of storage case 60, while choke coils 68a and 68b are sandwiched between the second projecting pressers 76b and bottom 61 of storage case 60. Thus, capacitors 26a, 26b and choke coils 28a, 28b can be secured stably even under a severe shaking or vibrating environment like a vehicle.

Capacitors 66a, 66b and choke coils 68a, 68b can also be supported stably if they are positioned out of contact with bottom 61 of storage case 60 and are pressed downward by the first projecting pressers 76a and second projecting pressers 76b.

In particular, choke coils 68a and 68b can be supported more stably if they are supported at their ends so that they are positioned out of contact with the bottom of storage case 60 and then pressed downward by the second projecting pressers 76b, since they will bend downwards and produce tension.

If an elastic material like butyl rubber or urethane foam is placed between capacitors 26a, 26b and choke coils 28a, 28b and the first projecting pressers 76a and second projecting pressers 76b respectively and then these components are pressed downward, small difference in dimensions between these electrical components and the first projecting pressers 76a and second projecting pressers 76b will be eliminated, thus providing more stable support for these components.

Capacitors 66a, 66b and choke coils 68a, 68b form a noise filter which eliminates electrical noise generated from motor section 52. Each of internal connecting terminals 62a, 62b and external connecting terminals 64a through 64e is formed by bending conductive plates so that connecting plate 63 used to directly connect capacitors 66a, 66b and choke coils 68a, 68b is constructed into one unit.

Figure 11:
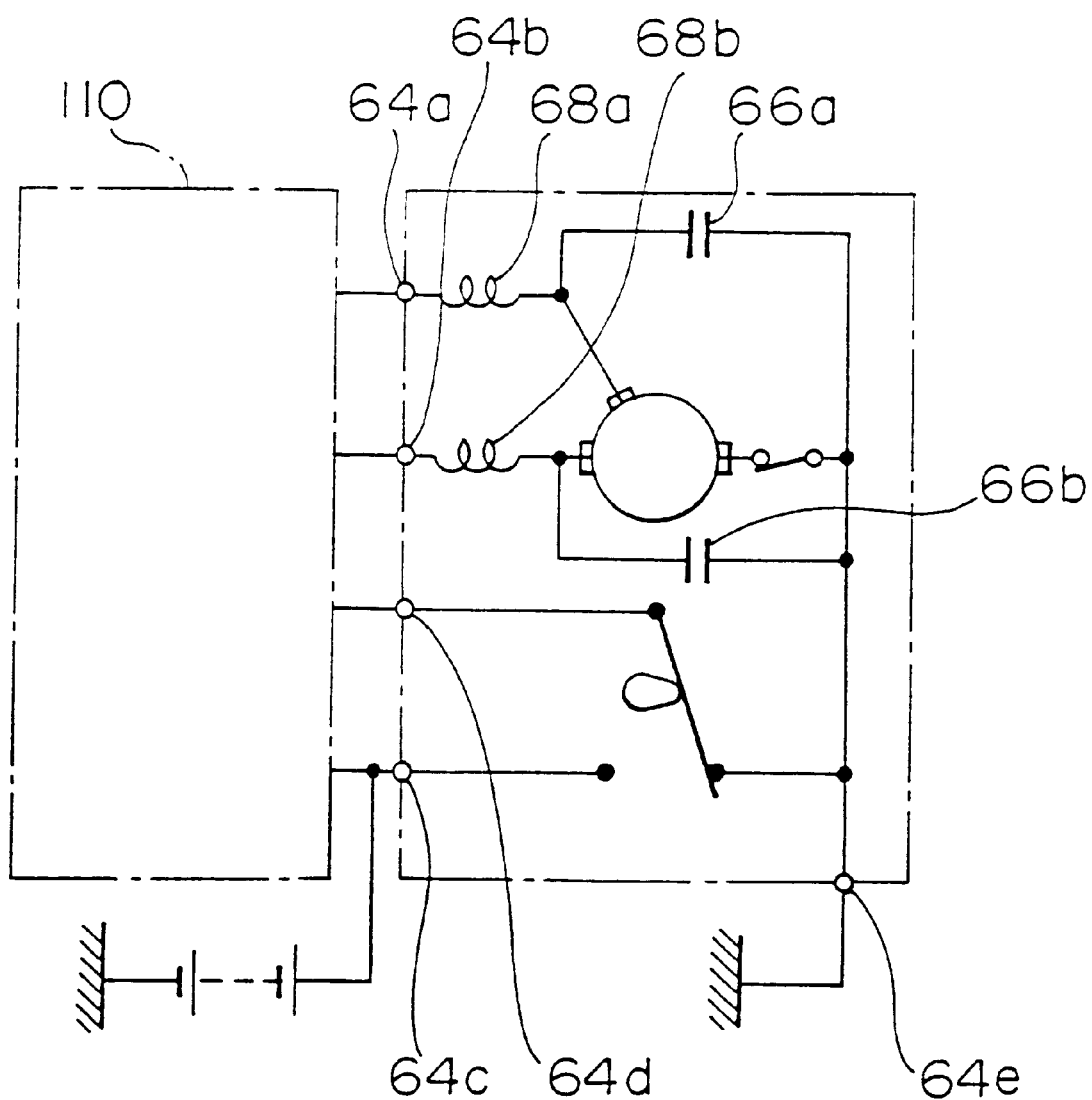
FIG. 11 shows a circuit diagram of external connecting terminals and electrical components in the second embodiment.

FIG. 11 shows a connecting circuit diagram for the above components. As shown in FIGS. 9 and 11, external connecting terminal 64a is connected to one end of choke coil 68a via connecting plate 63, and the other end of choke coil 68a is connected to connecting plate 63 of internal connecting terminal 62a. One end of capacitor 66a is also connected to connecting plate 63 of internal connecting terminal 62a, and the other end of capacitor 66a is grounded.

External connecting terminal 64b is connected to one end of choke coil 68b via connecting plate 63, and the other end of choke coil 68b is connected to connecting plate 63 of internal connecting terminal 62b. One end of capacitor 66b is also connected to connecting plate 63 of internal connecting terminal 62b, and the other end of capacitor 66b is grounded.

Capacitors 66a, 66b and choke coils 68a, 68b are connected directly to connecting plate 63, without use of lead wires. These connections are made by inserting terminals of capacitors 66a, 66b and choke coils 68a, 68b into slots (not shown in the figures) provided on connecting plates 63 and caulking them by heating. This makes connecting work easy and connecting materials simple because no soldering is performed.

Furthermore, if connecting plates 63 are fixed, capacitors 66a, 66b and choke coils 68a, 68b will not be detached even if they are subjected to vibration. Connecting plates 63 can also be fixed more simply than lead wires, so fixing work can also be simplified.

Fixing of connecting plates 63 are carried out, for instance, by providing a projection on bottom 61 of storage case 60, which is formed beforehand using plastic, and providing a hole on connecting plate 63, then inserting the projection into the hole and heating it until it is melted and fixed to the hole, or by providing a pawl on connecting plate 63 and inserting it into a hole provided on storage case 60 then bending the projected part of the pawl to fix.

Connecting plates 63 and internal connecting terminals 62a, 62b and external connecting terminals 64a, 64b are provided in one unit, thus connecting plates 63 can be fixed if internal connecting terminals 62a, 62b and external connecting terminals 64a, 64b are fixed, thus making fixing work simple.

As shown in FIG. 11, external connecting terminals 64a, 64b, 64c and 64d are connected to electronic control circuit or computer 110 which detects the position of the wiper and controls the motor, and external connecting terminal 64e is grounded. Circuit 110 is provided on the back of gear cover 58.

As shown in FIGS. 8A through 8C, internal connecting terminal 62a is connected to terminal 52a and internal connecting terminal 62b is connected to terminal 52b. Both internal connecting terminals 62a and 62b are connected to the brush side inside motor section 52.

As shown in FIGS. 10A through 10D, storage cover 70 is so shaped that it covers storage case 60, and has engaging holes 70a which corresponds to engaging projections 60a. Monoblock connector housing section 72 is provided on top of storage cover 70 to store external connecting terminals 64a, 64b, 64c, 64d and 64e. Holes 72a are provided on this connector housing section 72 so that external connecting terminals 64a, 64b, 64c, 64d and 64e can be inserted.

Thus, when storage cover 70 is placed on storage case 60, engaging projections 60a are engaged with engaging hole 70a to prevent detachment of storage cover 70. Connector housing section 72 will accommodate external connecting terminals 64a, 64b, 64c, 64d and 64e, and act as a connector.

As shown in FIG. 10B, inner rib 74 is formed on the inner surface of storage cover 70 so that it can be positioned inside storage case 60. Moreover, inner rib 74 is provided so that it covers the entire circumference of storage case 60. Inner rib 74 allows sealing slot 74a to be provided between inner rib 74 and external wall 70b of storage cover 70. If sealing slot 74a is filled with sealing material like butyl rubber or liquid gasket, tightness between storage case 60 and storage cover 70 will be improved, resulting in improved water proofing.

Storage cover 70 is assembled to storage case 60 as it is slid in direction "P" indicated in FIG. 10A, that is, the direction in which external connecting terminals 64a, 64b, 64c, 64d and 64e of storage case 60 are extending out, then engaging projections 60a are engaged with engaging holes 70a at the specified positions on storage case 60.

Storage cover 70 is slid and assembled to storage case 60 as guiding projections 75 provided on storage cover 70 slides along guiding slots 65 as shown in FIG. 9.

In the second embodiment, capacitors 66a, 66b and choke coils 68a, 68b are secured stably when storage cover 70 is placed on storage case 60, because they are pressed down by projecting pressers 76a and second projecting pressers 76b formed on storage cover 70. Storage case 60 may be provided on motor section 52, though it is provided on gear cover 58 in the above embodiment. It is also possible to store other necessary electrical components in storage case 60, though only capacitors and choke coils are stored in storage case 60 in the second embodiment.

The present invention having been described above may be modified in many ways without departing from the spirit of the invention.

What is claimed is:

1. A method for assembling a terminal device on an electric device, said method comprising the steps of:

mounting inside a storage case an electric circuit having an internal terminal, an external terminal and an electric component part including terminals and a body, said electric component part being connected between said internal terminal and said external terminal and said electric component part being kept away from a bottom of said storage case;

placing a case cover formed with a presser member to face said storage case with said presser member being directed toward said electric component part;

causing relative movement between said storage case and said case cover while bending a part of said electric component part toward said bottom of said storage case through contact of said presser member with said electric component part; and engaging said case cover with said storage case while maintaining said electric component part pressed between said bottom and said cover member.

2. A method according to claim 1, further comprising the step of:

mounting said storage case on an electric motor for a vehicle; and connecting said internal terminal to said motor.

3. A method according to claim 1, wherein:

said electric circuit includes a noise filter circuit constructed by a capacitor and a coil as said electric component part.

4. A method according to claim 1, wherein:

said electric component part includes a plurality of electric component parts provided at a plurality of locations in said storage case; and said presser member includes a plurality of presser members disposed at a plurality of locations in correspondence to said locations of said electric component part.

5. A method for assembling a terminal device on an electric device, said method comprising the steps of:

fixedly mounting an electric circuit inside a storage case, said electric circuit having an internal terminal, an external terminal and an electric component part connected between said internal terminal and said external terminal, said electric component part having terminals fixed to a bottom of said storage case;

placing a case cover formed with a presser member to face said storage case with said presser member being directed toward said electric component part;

causing relative movement between said storage case and said case cover while pressing said electric component part toward said bottom of said storage case through contact of said presser member with said electric component part; and engaging said case cover with said storage case while maintaining said electric component part pressed between said bottom and said cover member.

6. A method according to claim 5, wherein:

said presser member extends in a longitudinal direction of said electric component part.

7. A method according to claim 5, wherein:

said electric circuit includes a noise filter circuit constructed by a capacitor and a coil as said electric component part.

8. A method according to claim 6, wherein:

said electric component part includes a plurality of electric component parts provided at a plurality of locations in said storage case; and said presser member includes a plurality of presser members disposed at a plurality of locations in correspondence to said locations of said electric component part.

* * * * *